US 10,346,490 B2

(12) United States Patent
Kersting

(10) Patent No.: US 10,346,490 B2
(45) Date of Patent: Jul. 9, 2019

(54) PLATFORM DEVICE FOR PASSIVELY DISTRIBUTED QUALITATIVE COLLECTIVE KNOWLEDGE

(71) Applicant: Patrick Faulwetter, Marina Del Rey, CA (US)

(72) Inventor: Björn Kersting, Braunfels (DE)

( * ) Notice: Subject to any disclaimer, the term of this patent is extended or adjusted under 35 U.S.C. 154(b) by 480 days.

(21) Appl. No.: 15/100,450

(22) PCT Filed: Jun. 27, 2014

(86) PCT No.: PCT/DE2014/100216
§ 371 (c)(1),
(2) Date: Sep. 6, 2016

(87) PCT Pub. No.: WO2015/078440
PCT Pub. Date: Jun. 4, 2015

(65) Prior Publication Data
US 2016/0371382 A1    Dec. 22, 2016

(30) Foreign Application Priority Data

Nov. 28, 2013    (WO) ................ PCT/DE2013/100400

(51) Int. Cl.
*G06Q 10/10*      (2012.01)
*G06Q 30/02*      (2012.01)
(Continued)

(52) U.S. Cl.
CPC ........ *G06F 16/9535* (2019.01); *G06F 16/953* (2019.01); *G06F 16/958* (2019.01);
(Continued)

(58) Field of Classification Search
CPC ........... G06F 17/30867; G06F 16/9535; G06F 16/958; G06F 16/953; G06Q 30/0239;
(Continued)

(56) References Cited

U.S. PATENT DOCUMENTS 8,612,449 B1 * 12/2013 Cuthbert ............ G06Q 30/0603
707/740
8,645,295 B1 * 2/2014 Dillard ................. G06Q 30/02
705/7.29
(Continued)

FOREIGN PATENT DOCUMENTS

WO    2013/029602 A1    3/2013
WO    2013/029605 A1    3/2013

OTHER PUBLICATIONS

Basic Support for Cooperative Work, Version 4.4, Oct. 2007, OrbiTeam Software GmbH & Co. KG, Bonn, Germany.
(Continued)

*Primary Examiner* — David T. Brooks
(74) *Attorney, Agent, or Firm* — Bachman & LaPointe, P.C.

(57) ABSTRACT

In the case of a platform device (100) located at a web site and capable of forming a network with a plurality of ID-detectable users or participants for the purpose of gathering and processing items of information stored in code-identifiable memory spaces (110) of a platform (100) assigned to a plurality of different topics by the users or participants, a passive automated distribution of information collected by the users or participants is made possible in that the memory spaces (110) on the platform (100) are each formed by a dual unit (DuU), which dual unit (DuU) comprises a first memory space (111) that is assigned to a predefinable topic and provided with initial items of information (114) which has been formulated by an initial participant but which are not editable by any other individual user or participant and a second memory space (112) assigned to the first memory space (111), which second memory space (112) is editable by any individual user or participant and is construed for the inclusion, by the plurality
(Continued)

of users or participants, of information (113) additional to the initial information stored in the first memory space (111).

20 Claims, 3 Drawing Sheets

(51) Int. Cl.
G06Q 30/06 (2012.01)
H04L 29/08 (2006.01)
G06F 16/953 (2019.01)
G06F 16/958 (2019.01)
G06F 16/9535 (2019.01)

(52) U.S. Cl.
CPC ....... *G06Q 10/103* (2013.01); *G06Q 30/0239* (2013.01); *G06Q 30/0282* (2013.01); *G06Q 30/0621* (2013.01); *H04L 67/10* (2013.01)

(58) Field of Classification Search
CPC ............ G06Q 10/103; G06Q 30/0282; G06Q 30/0601; G06Q 30/0621; G06Q 30/0631; H04L 67/10
See application file for complete search history.

(56) References Cited

U.S. PATENT DOCUMENTS

| | | | | |
|---|---|---|---|---|
| 9,009,082 B1* | 4/2015 | Marshall | ............... | G06Q 99/00 705/26.1 |
| 2002/0049738 A1* | 4/2002 | Epstein | ............. | G06F 17/30864 |
| 2005/0223002 A1* | 10/2005 | Agarwal | ........... | G06F 17/30864 |
| 2010/0106560 A1* | 4/2010 | Li | .......... | G06Q 10/06 705/317 |
| 2011/0010335 A1* | 1/2011 | Fox | ........ | G06Q 10/10 707/608 |
| 2011/0178981 A1* | 7/2011 | Bowen | ................. | G06Q 10/00 707/608 |
| 2012/0323725 A1* | 12/2012 | Johnston | ............ | G06Q 30/02 705/26.7 |
| 2013/0254298 A1* | 9/2013 | Lorphelin | ............ | G06Q 10/06 709/205 |
| 2013/0317891 A1* | 11/2013 | Grigorash | ............. | H04H 60/31 705/12 |
| 2014/0181210 A1 | 6/2014 | Kersting | | |
| 2014/0330831 A1 | 11/2014 | Kersting | | |
| 2014/0365457 A1 | 12/2014 | Kersting et al. | | |
| 2014/0372432 A1 | 12/2014 | Kersting | | |

OTHER PUBLICATIONS

International Search Report for PCT/DE2014/100216, dated Nov. 13, 2014.
International Search Report for PCT/DE2014/100210, dated Nov. 5, 2014.
International Search Report for PCT/DE2014/100211, dated Nov. 13, 2014.
International Search Report for PCT/DE2014/100213, dated Nov. 13, 2014.
International Search Report for PCT/DE2014/100214, dated Nov. 18, 2014.
International Search Report for PCT/DE2014/100215, dated Nov. 13, 2014.

* cited by examiner

PLATFORM DEVICE FOR PASSIVELY DISTRIBUTED QUALITATIVE COLLECTIVE KNOWLEDGE

BACKGROUND

The present invention relates to a platform device located at a web site and capable of forming a network with a plurality of ID-detectable users or participants and adapted for the purpose of gathering and processing items of information each stored in a code-identifiable memory space of a platform assigned to a plurality of different topics by said users or participants.

Platform devices of the type mentioned above are known in the prior art for a number of applications. Said devices are for example operated in world-wide internet. The prior platform devices, however, suffer from the drawback that it is not possible to achieve a specific selection of predefinable links and at the same time to define links achievable according to predefinable criteria. One reason for this is that the current platforms store items of information without strictly predefinable processing criteria and strictly predefinable evaluation criteria being attributed to said items of information.

Moreover, the prior platform devices are inefficient as regards the distribution of collective knowledge.

SUMMARY

Thus it is an object of the present invention to provide a platform device by means of which items of information stored in a first memory can be utilized by the network participants according to strictly predefinable processing criteria and are capable of being supplemented or amended in some other manner and by means of which there is enabled an effective automated distribution of, in particular, collective knowledge representing an item of qualitative information.

With regard to a platform device of the type mentioned above, this object is achieved in that the memory spaces on the platform are each formed by a dual unit (DuU), which dual units (DuU) each comprise a first memory space that is assigned to a predefinable topic and provided with initial items of information which have been formulated by an initial participant but which are not editable by any other individual user or participant, and a second memory space which is assigned to the first memory space and is capable of being edited by any individual user or participant and is construed for the inclusion, by the plurality of users or participants, of information additional to the initial information stored in the first memory space, wherein, on recognition of the predefined topic by a search engine located at a web site and reacting to a search term designated as electronic filter and corresponding to the predefined topic of the associated dual unit, a copying device copies the contents of the first memory space of the dual unit and the contents of the second memory space of the dual unit and transfers, by means of a transmitting unit, said contents as a bundle of information to said search engine located at a web site.

Preferred embodiments of the invention are the subject matter of the subclaims.

With regard to the platform device of the invention, there is provided a combination of features to the effect that the memory spaces on the platform are each formed by a dual unit (DuU), which dual unit (DuU) comprises a first memory space, which is assigned to a predefinable topic and is provided with initial items of information which have been formulated by an initial participant but which are not editable by any other individual user or participant, and a second memory space assigned to the first memory space, which second memory space is editable by any individual user or participant and is construed for the inclusion, by the plurality of users or participants, of information additional to the initial information stored in the first memory space, wherein, on recognition of the predefined topic by a search engine located at a web site and reacting to a search term designated as electronic filter and corresponding to the predefined topic of the associated dual unit, a copying device copies the contents of the first memory space of the dual unit and the contents of the second memory space of the dual unit and transfers the same, by means of a transmitting unit, as a bundle of information to the search engine located at a web site, which combination of features described above has the effect that, by way of the formation of dual units, items of information, particularly those forming an item of qualitative information, are capable of being processed according to very specific processing rules, are capable of being amended, and are then capable of being stored, wherein the items of information provided in the form of individual evaluations, individual supplements, and individual comments create a form of collective knowledge, which can be submitted to a predeterminable number of users or participants according to strictly predefinable criteria by passive automated transmission (DuU-feed).

The aim and purpose of a processing operation capable of being carried out by the plurality of users or participants is thus primarily to render an initial item of information which has been imported to a first memory space of a dual unit by an initial author, suitable for utilization and processing by other users or participants so as to provide the initial item of information with a reliability rating or alternatively reliability evaluation which is imported to the first memory space on conclusion of a processing operation accomplished according to the invention and which represents, for all interested persons, a clearly defined collective evaluation carried out by the users or participants.

According to a first preferred embodiment of the device of the invention provision is made such that a supplementary item of information of a qualitative evaluation of the information stored in the first memory space is formed by the plurality of users or participants.

Preferably, at least one calculating device is provided for the purpose of producing an item of collective evaluation information on the basis of the imported qualitative evaluations provided by the users or participants. In this case, it is possible for additional information in the editable second memory space to be in the form of qualitative evaluations of the items of information stored in the first memory space as ascertained by means of the at least one calculating device capable of being imported and stored by the users or participants, wherein the at least one calculating device is then construed for the purpose of producing an item of collective evaluation information on the basis of the imported individual qualitative evaluations.

The at least one calculating device is preferably construed so as to carry out a qualitative evaluation by the submission of individually assignable points according to a point scale having a predefined number of points as made possible for each of the users or participants, wherein the points assigned for each submission can be stored in an associated points storage means. In this case, a point scale can be utilized, for example, that is construed so as to make it possible for each of the users or participants to award points weighted between zero and 100.

According to an important preferred embodiment of the device of the invention, provision is made such that a first calculating device is provided, which forms an average value of the cumulative points imported to the second memory space and assigned in each case by different users or participants and stores the relevant number in the second memory space, wherein an average point value is calculated by adding together all points weighted between zero and a maximum number of points of the point scale as have been awarded by users or participants during the course of each evaluation, and dividing the result by the number of users or participants that have in each case submitted an evaluation.

A second calculating device is preferably additionally provided, which computes the variance of the cumulative points imported to the second memory space and assigned in each case by different users or participants and stores the relevant number in the second memory space, the variance being defined as the average deviation of the points from the average point value as ascertained by the first calculating device.

According to another preferred embodiment of the device of the invention, a first copying device is provided, which successively interprets the qualitative evaluations stored in the second memory space at predefinable time intervals as being useful items of information and transfers the same to the first memory space while overwriting the relevant previous items of information in the first memory space.

In addition, there is preferably also provided a timing device that transmits reset signals to the first and second calculating devices and also to the first copying device at predefinable constant time intervals so as to set the said devices to zero on conclusion of a respective presettable time interval and to effect repetition of the currently assigned function in each subsequent period of time of equal length.

According to an embodiment of the device of the invention that is similar to the above embodiment, the editable second memory space is subdivided into a contents memory space, to which information additional to the items of information stored in the first memory space can be imported in the form of supplementary information of the items of information stored in the first memory space, and an evaluation memory space, to which qualitative evaluations of the supplementary information stored in the second memory space can be imported by the users or participants, wherein at least one calculating device is provided for the purpose of producing an item of collective evaluation information on the basis of the imported qualitative evaluations.

The at least one calculating device available in this context is preferably construed so as to make it possible to carry out a qualitative evaluation by means of the inclusion, in the second memory space, of individually assignable points according to a point scale having a predefined number of points, as made possible for each of the users or participants, wherein the points assigned for each inclusion can be stored in an associated points storage means. The point scale can also be construed in this context so as to make it possible for each of the users or participants to assign points ranging from zero to 100. The point scale can also be construed in this context so as to make it possible for each of the users or participants to assign points ranging from zero to 100.

Preferably, a third calculating device is employed for the purpose of forming an average value of the cumulative points imported to the second memory space and assigned in each case by different users or participants and for the purpose of storing the relevant number in the second memory space, wherein an average point value is calculated by adding together all points weighted between zero and a maximum number of points as have been awarded by users or participants during the course of each evaluation of an additional item of information, and dividing the result by the number of users or participants that have in each case submitted an evaluation of an additional item of information.

A fourth calculating device is preferably provided, which computes the variance of the cumulative points imported to the second memory space and assigned in each case by different users or participants and stores the relevant number in the second memory space, the variance being defined as the average deviation of the points from the average point value of the evaluation of an additional item of information as ascertained by the third calculating device.

A second copying device is preferably likewise provided, which, on conclusion of predefinable time intervals, successively interprets the qualitative evaluations of an additional item of information stored in the second memory space, as being useful or non-useful items of information according to predetermined stipulations relating to averages and variances, in a first decision-making device, and transfers the additional item of information, on identifying it as being a useful item of information, to the first memory space.

In this context, a timing device is preferably also provided, which transmits reset signals to the third and fourth calculating devices and also to the second copying device at predefinable constant time intervals so as to set the said devices to zero on conclusion of a respective presettable time interval and to effect repetition of the currently assigned function in each subsequent period of time of equal length.

According to an embodiment of the device of the invention that is similar to the above embodiment, the editable second memory space is subdivided into a contents memory space, to which information additional to the items of information stored in the first memory space can be imported in the form of corrective information of the items of information stored in the first memory space, and an evaluation memory space, to which qualitative evaluations of the corrective information stored in the second memory space can be imported, wherein at least one calculating device is provided for the purpose of producing collective evaluation information on account of the imported qualitative evaluations.

According to a preferred embodiment, the at least one calculating device is construed so as to make it possible to carry out a qualitative evaluation by the inclusion, in the second memory space, of individually assignable points according to a point scale having a predefined number of points, as made possible for each of the users or participants, wherein the points assigned for each inclusion can be stored in an associated points storage means, and wherein the point scale is also preferably construed so as to make it possible for each of the users or participants to assign points ranging from zero to 100.

A fifth calculating device is preferably provided, which forms an average value of the cumulative points imported to the second memory space and assigned in each case by different users or participants and stores the relevant number in the second memory space, wherein an average point value is calculated by adding together all of the points weighted between zero and a maximum number of points as have been awarded by users or participants during the course of each evaluation of a corrective information, and dividing the result by the number of users or participants that have in each case submitted an evaluation of a corrective item of information.

According to yet another preferred embodiment of the device of the invention, a sixth calculating device is provided, which computes the variance of the cumulative points imported to the second memory space and assigned in each case by different users or participants and stores the relevant number in the second memory space, the variance being defined as the average deviation of the points from the average point value of the evaluation of a corrective information as ascertained by the fifth calculating device.

A third copying device is in addition preferably provided, which successively interprets, on conclusion of predefinable time intervals, the qualitative evaluations of corrective information stored in the second memory space, as being useful or non-useful items of information according to predetermined stipulations relating to averages and variances, in a second decision-making device and transfers the corrective information, on identifying it as being a useful item of information, to the first memory space while overwriting the relevant previous items of information in the first memory space.

According to a further preferred embodiment of the device of the invention a timing device is provided, which transmits reset signals to the fifth and sixth calculating devices and also to the third copying device at predefinable constant time intervals so as to set the said devices to zero on conclusion of a said presettable time interval and to effect repetition of the currently assigned function in each subsequent period of time of equal length.

Preferably, each of the users or participants is able to make an initial placement of a dual unit having first and second memory spaces, as initial participant.

BRIEF DESCRIPTION OF THE DRAWINGS

The device of the invention is described below with reference to a preferred embodiment as illustrated in the Figures of the accompanying drawings, in which.

DETAILED DESCRIPTION

Figure 1:
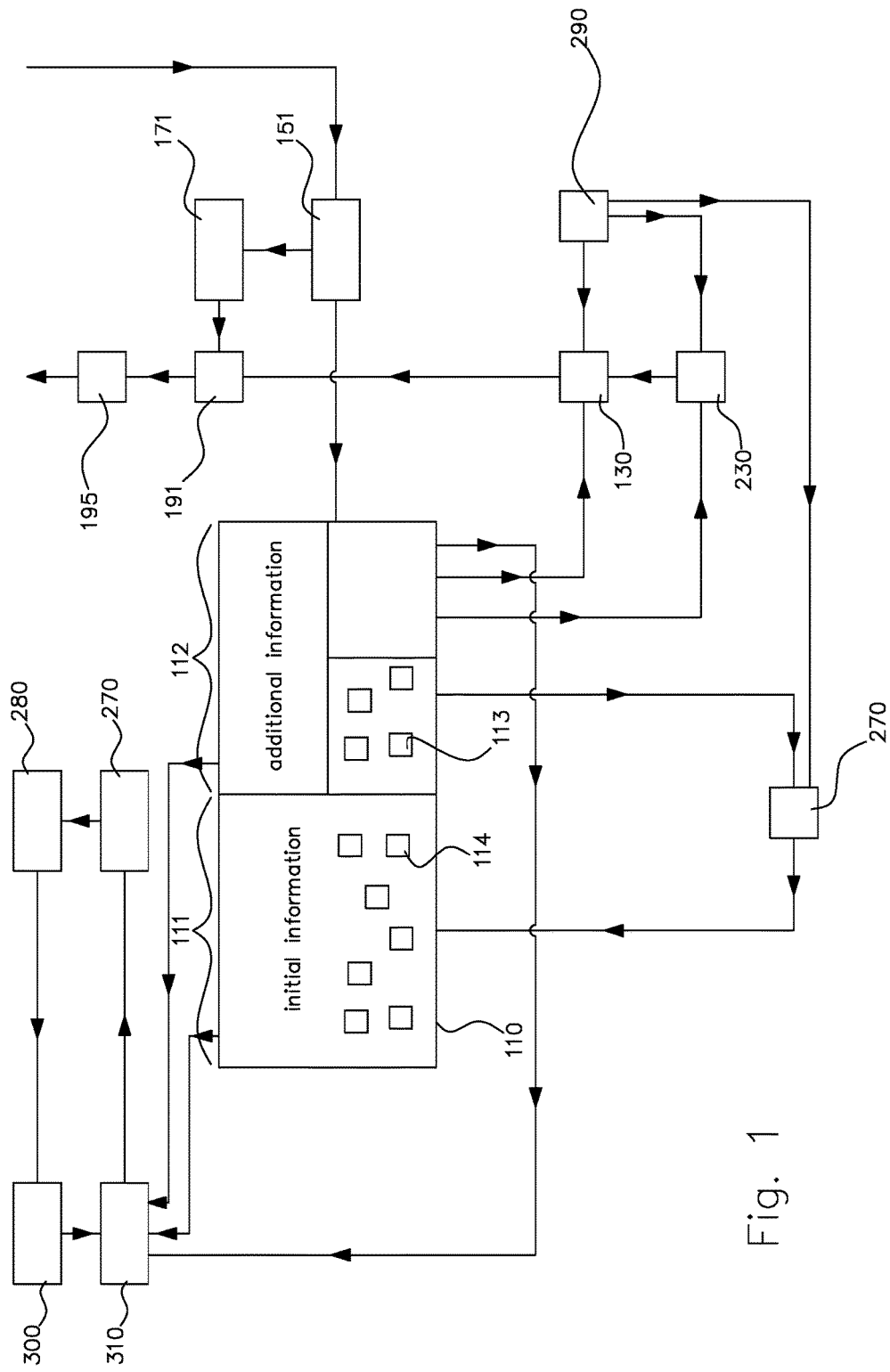
FIG. 1 shows a general layout of a dual unit (DuU) corresponding to a preferred embodiment of the invention, in the form of a block diagram.

The platform device 100 of the invention located at a web site is capable of forming a network with a plurality of ID-detectable users or participants and is construed for the purpose of gathering and processing items of information stored in a plurality of code-identifiable and topic-dependent memory spaces 110 of a platform 100 by the users or participants.

The memory spaces 110 subdivided into a large number of different topics are each formed on the platform 100 by a dual unit (DuU), which dual units (DuU) each comprise a first memory space 111 that is assigned to a predefinable topic and provided with initial items of information 114 which have been formulated by an initial participant but are not editable by any other individual user or participant, and a second memory space 112 which is assigned to the first memory space 111 and is editable by any individual user or participant and is construed for the inclusion, by the plurality of users or participants, of information 113 additional to the initial item of information 114 stored in the first memory space 111.

In the case of recognition of the preset topic by a search engine 300 located at a web site and reacting to the use of a search term designated as electronic filter 310 and corresponding to the preset topic of the associated dual unit, a copying device 270 copies the contents of the first memory space 111 and the contents of the second memory space 112 of the dual unit and transfers these contents by means of a transmitting unit 280 as a bundle of information to the search engine 300.

In the case of the embodiment of the present invention shown in FIG. 1 there is formed, by the plurality of users or participants, a supplementary item of information of a qualitative evaluation of the items of information stored in the first memory space 111, at least one calculating device 130 being provided for the purpose of producing an item of collective evaluation information on the basis of the qualitative evaluations imported by the users or participants.

To the editable second memory space 112, additional items of information 113 can be imported in the form of qualitative evaluations of the items of information stored in the first memory space 111, as ascertained by means of the at least one calculating device 130, and said items of information 113 can be stored by the users or participants, wherein the at least one calculating device 130 is construed for the purpose of producing an item of collective evaluation information on the basis of the imported individual qualitative evaluations.

The at least one calculating device 130 is construed so as to make it possible for each of the users or participants to carry out a qualitative evaluation by the inclusion, made possible for each of the users or participants, of points to be individually assigned according to a point scale having a predefined number of points ranging from zero to 100.

A first calculating device 130 is provided, which forms an average value of the cumulative points imported to the second memory space and assigned in each case by different users or participants and which stores the relevant number in the second memory space 112, wherein a mean point value is calculated by adding together all points between zero and a maximum number of points according to a point scale as have been awarded by users or participants during the course of each evaluation, and dividing the result by the number of users or participants that have in each case submitted an evaluation.

A second calculating device 230 is provided, which computes the variance of the points numerically imported to the second memory space 112 and in each case awarded by different users or participants and which stores the relevant number in the second memory space 112, the variance being defined as the average deviation of the points from the mean point value as ascertained by the first calculating device 130.

In addition, there is provided a first copying device 270, which successively interprets the qualitative evaluations stored in the second memory space 112 at settable time intervals as being useful items of information, and which transfers the same to the first memory space 111 while overwriting the relevant previous items of information in the first memory space 111.

A timing device 290 is provided, which, on termination of settable constant time intervals, transmits reset signals to the first and second calculating devices 130, 230 and also to the first copying device 270, in order to set the said devices to zero on conclusion of a respective presettable time interval and to effect repetition of the currently assigned function in each subsequent period of time of equal length.

Figure 2:
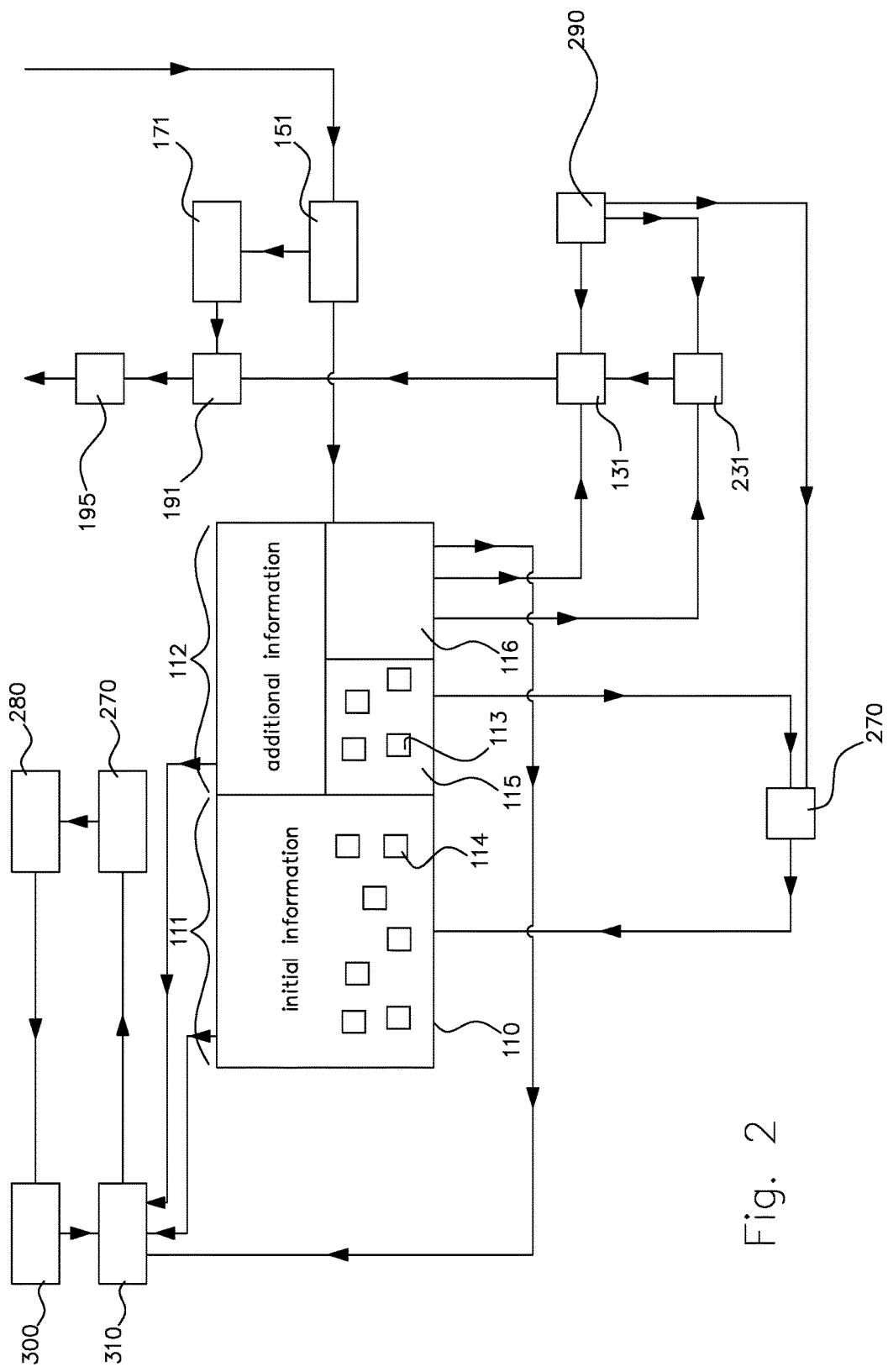
FIG. 2 shows a second embodiment of the device of the invention in a block view.

In the case of the embodiment of the present invention shown in FIG. 2, the editable second memory space 112 is subdivided into a contents memory space 115, to which information 113 additional to the items of information stored in the first memory space 111 can be imported in the form of supplementary information concerning the items of information stored in the first memory space 111, and an evaluation memory space 116, to which qualitative evaluations of the supplementary information stored in the second memory space 112 can be imported by the users or participants, at least one third calculating device 131 being provided in order to produce an item of collective evaluation information on the basis of the imported qualitative evaluations.

The third calculating device 131 is construed so as to carry out a qualitative evaluation by means of the inclusion of individually assignable points according to a point scale having a predefined number of points, as made possible for each of the users or participants in the second memory space 112, wherein the point scale is in turn construed so as to make it possible to award points weighted between zero and 100 by each of the users or participants.

The third calculating device 131 is construed so as to form an average value of the cumulative points imported to the second memory space 112 and assigned in each case by different users or participants and to store the relevant number in the second memory space 112, wherein an average point value is calculated by adding together all points weighted between zero and a maximum number of points as have been awarded by users or participants during the course of each evaluation of a supplementary item of information, and dividing the result by the number of users or participants that have in each case submitted an evaluation of a supplementary item of information.

In addition, a fourth calculating device 231 is provided, which computes the variance of the cumulative points imported to the second memory space 112 and assigned in each case by different users or participants and which stores the relevant number in the second memory space 112, the variance being defined as the average deviation of the points from the average point value of the evaluation of a supplementary item of information as ascertained by the third calculating device 131.

A second copying device 270 is likewise provided, which successively interprets, on conclusion of settable time intervals, the qualitative evaluations of a supplementary item of information as are stored in the second memory space 112, as being useful or non-useful items of information according to predetermined stipulations relating to average values and variances, in a first decision-making device and which transfers the supplementary item of information, on identifying it as being a useful item of information, to the first memory space 111.

A timing device 290 is provided, which transmits reset signals to the third and fourth calculating devices 131 and 231 and also to the second copying device 270 at predefined constant time intervals so as to set the said devices to zero on conclusion of a respective presettable time interval and to effect repetition of the currently assigned function in each subsequent period of time of equal length.

Figure 3:
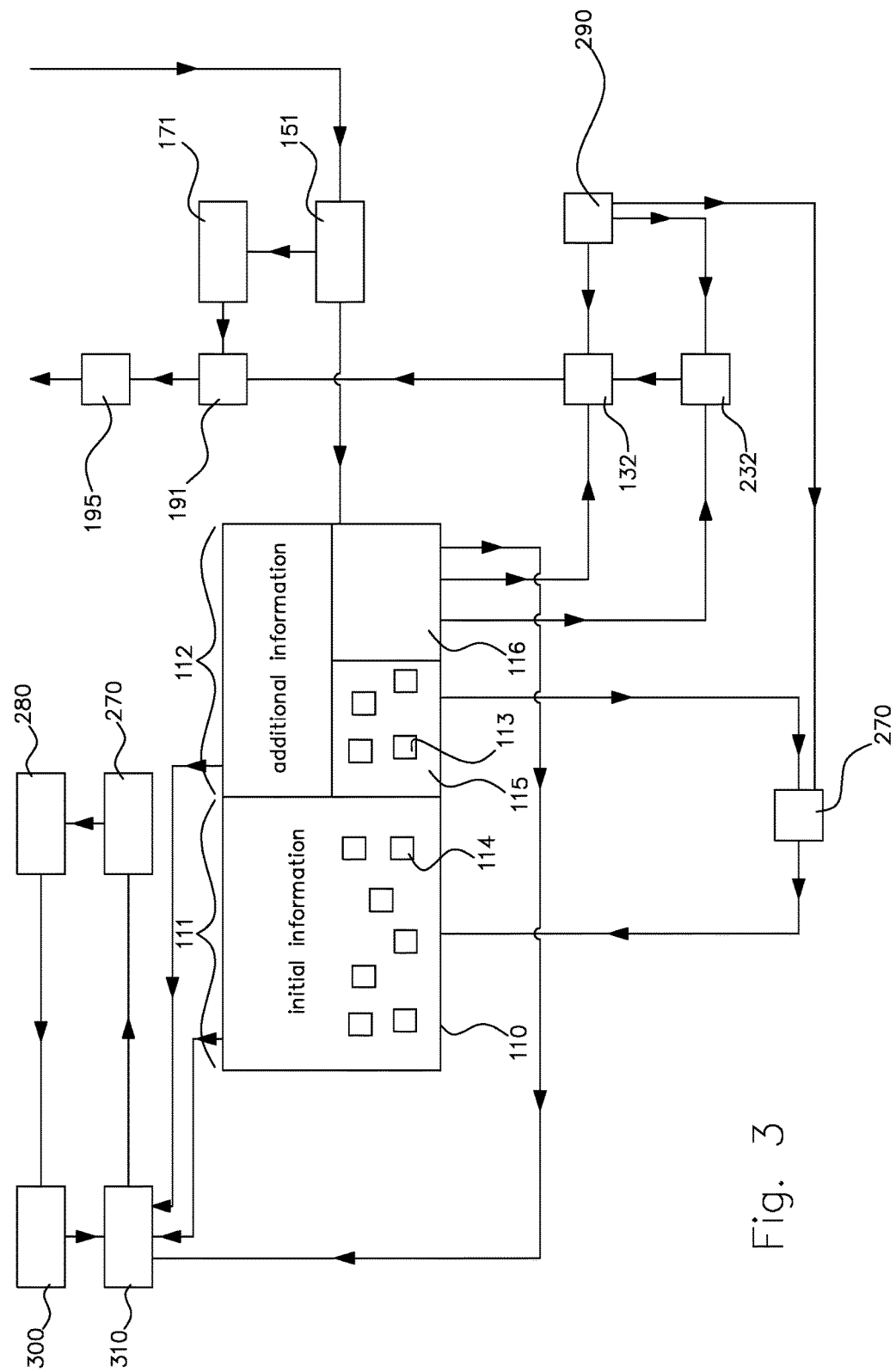
FIG. 3 shows a third embodiment of the device of the invention in a block view.

In the case of the embodiment of the present invention shown in FIG. 3, the editable second memory space 112 is subdivided into a contents memory space 115, to which information 113 additional to the items of information stored in the first memory space 111 can be imported in the form of corrective information of the items of information stored in the first memory space 111, and an evaluation memory space 116, to which qualitative evaluations of the corrective information stored in the second memory space 112 can be imported, at least one fifth calculating device 132 being provided for the purpose of producing collective evaluation information on the basis of the imported qualitative evaluations.

The fifth calculating device 132 is construed so as to carry out a qualitative evaluation by the inclusion of individually assignable points according to a point scale having a predefined number of points as made possible for each of the users or participants in the second memory space 112. Here again, the point scale is construed so as to make it possible to award points weighted between zero and 100 by each of the users or participants.

The fifth calculating device 132 is adapted so as to form an average value of the cumulative points imported to the second memory space 112 and assigned in each case by different users or participants and to store the relevant number in the second memory space 112, wherein an average point value is calculated by adding together all points weighted between zero and 100 as have been awarded by users or participants during the course of each evaluation of an item of corrective information, and dividing the result by the number of users or participants that have in each case submitted an evaluation of the corrective information.

In addition, a sixth calculating device 232 is provided, which computes the variance of the cumulative points imported to the second memory space 112 and assigned in each case by different users or participants and which stores the relevant number in the second memory space 112, the variance being defined as the average deviation of the points from the average point value of the evaluation of corrective information as ascertained by the fifth calculating device 132.

A third copying device 270 is provided, which successively interprets, on conclusion of settable time intervals, the qualitative evaluations of corrective information as are stored in the second memory space 112, as being useful or non-useful items of information according to predetermined stipulations relating to averages and variances, in a second decision-making device and transfers the corrective information, on identifying it as being a useful item of information, to the first memory space 111 while overwriting the relevant previous items of information in the first memory space 111.

A timing device 290 is provided, which transmits reset signals to the fifth and sixth calculating devices 132 and 232 and also to the third copying device 270 at predefined constant time intervals so as to set the said devices to zero on conclusion of a respective presettable time interval and to effect repetition of the currently assigned function during each subsequent period of time of equal length.

Each of the users or participants has the possibility, as initial participant, of making an initial placement on a dual unit having a first memory space 111 and a second memory space 112.

The embodiment of the invention explained above merely serves the purpose of providing a better understanding of the teaching of the invention as defined by the claims and which is not restricted, as such, by the present embodiment.

The invention claimed is:

1. One or more servers hosting a web site, the web site comprising:
   a search engine;
   a platform device capable of forming a network with a plurality of ID-detectable users or participants for the purpose of gathering and processing items of information stored in code-identifiable memory spaces of the platform device and assigned to a plurality of different topics by the users or participants, the platform device comprising:

said code-identifiable memory spaces each formed by a dual unit (DuU), which dual units (DuU) each comprise:

a first memory space that is assigned to a predefinable topic and provided with initial items of information which has been formulated by an initial participant but which are not editable by any other individual user or participant; and a second memory space assigned to the first memory space, which second memory space is editable by any individual user or participant and is construed for the inclusion, by the plurality of users or participants, of information additional to the initial information stored in the first memory space and wherein, on recognition of the predefined topic by said search engine and reacting to a search term designated as electronic filter and corresponding to the predefined topic of the associated dual unit, a copying device copies the contents of the first memory space and the contents of the second memory space of the dual unit and transfers the same by means of a transmitting unit as a bundle of information to said search engine located at a web site, wherein:

supplementary information concerning a qualitative evaluation of the items of information stored in the first memory space is formable by the plurality of users or participants;

the editable second memory space is subdivided into a contents memory space, to which information additional to the items of information stored in the first memory space can be imported in the form of supplementary information of the items of information stored in the first memory space, and an evaluation memory space, to which qualitative evaluations of the supplementary information stored in the second memory space can be imported by the users or participants;

at least one first calculating device is provided for the purpose of producing collective evaluation information on the basis of the imported qualitative evaluations;

the at least one first calculating device is construed so as to carry out a qualitative evaluation by the inclusion of individually assignable points according to a point scale having a predefined number of points, as made possible for each of the users or participants in the second memory space, wherein the points assigned for each inclusion can be stored in an associated points storage means;

the point scale is construed so as to make it possible to award points weighted between zero and 100 by each of the users or participants;

the at least one first calculating device calculates an average value of the cumulative points imported to the second memory space and assigned in each case by different users or participants and stores the relevant number in the second memory space, wherein an average point value is calculated by adding together all points ranging from zero to a maximum number of points as have been awarded by users or participants during the course of each evaluation of a supplementary item of information, and dividing the result by the number of users or participants that have in each case submitted an evaluation of a supplementary item of information.

2. One or more servers as claimed in claim 1, characterized in that at least one second calculating device is provided for the purpose of producing an item of collective evaluation information by the users or participants on the basis of the imported qualitative evaluations.

3. One or more servers as claimed in claim 2, characterized in that to the editable second memory space additional information in the form of a qualitative evaluation of the items of information stored in the first memory space and ascertained by means of the at least one second calculating device can be imported by the users or participants, which additional information can be stored in an associated memory space, wherein the at least one second calculating device is construed for the purpose of producing collective evaluation information on the basis of the imported individual qualitative evaluations.

4. One or more servers as claimed in claim 3, characterized in that the at least one second calculating device is construed so as to carry out a qualitative evaluation by the inclusion of individually assignable points according to a point scale having a predefined number of points, as made possible for each of the users or participants, wherein the points assigned for each inclusion can be stored in an associated points storage means.

5. One or more servers as claimed in claim 4, characterized in that for the at least one second calculating device the point scale is construed so as to make it possible to award points weighted between zero and 100 by each of the users or participants.

6. One or more servers as claimed in claim 4, characterized in that the at least one second calculating device forms an average value of the cumulative points imported to the second memory space and assigned in each case by different users or participants and which stores the relevant number in the second memory space, wherein an average point value is calculated by adding together all points ranging from zero to a maximum number of points of the point scale as have been awarded by users or participants during the course of each evaluation, and dividing the result by the number of users or participants that have in each case submitted an evaluation.

7. One or more servers as claimed in claim 6, characterized in that a third calculating device computes the variance of the cumulative points imported to the second memory space and assigned in each case by different users or participants and which stores the relevant number in the second memory space, the variance being defined as the average deviation of the points from the average point value as ascertained by the at least one second calculating device.

8. One or more servers as claimed in claim 6, characterized in that a first copying device successively interprets the qualitative evaluations stored in the second memory space at predefinable time intervals as being useful items of information and transfers the same to the first memory space while overwriting the relevant previous items of information in the first memory space.

9. One or more servers as claimed in claim 6, characterized in that a timing device transmits reset signals to the second calculating device and to the third calculating device and also to the first copying device at predefinable constant time intervals so as to set the said devices to zero on conclusion of a said presettable time interval and to effect repetition of the currently assigned function in each subsequent period of time of equal length.

10. One or more servers as claimed in claim 1, characterized in that a fourth calculating device computes the variance of the cumulative points imported to the second memory space and assigned in each case by different users or participants and which stores the relevant number in the second memory space, the variance being defined as the average deviation of the points from the average point value of the evaluation of a supplementary item of information as ascertained by the first calculating device.

11. One or more servers as claimed in claim 10, characterized in that a second copying device successively interprets, on conclusion of predefinable time intervals, the qualitative evaluations of a supplementary item of information stored in the second memory space, as being useful or non-useful items of information according to predetermined stipulations relating to averages and variances, in a first decision-making device and which transfers the supplementary item of information, on identifying it as being a useful item of information, to the first memory space.

12. One or more servers as claimed in claim 11, characterized in that a timing device is provided, which transmits reset signals to the at least one first calculating device and to the fourth calculating device and also to the second copying device at predefinable constant time intervals so as to set the said devices to zero on conclusion of a respective presettable time interval and to effect repetition of the currently assigned function in each subsequent period of time of equal length.

13. One or more servers as claimed in claim 1, characterized in that the editable second memory space is subdivided into a contents memory space, to which information additional to the items of information stored in the first memory space can be imported in the form of corrective information of the items of information stored in the first memory space, and an evaluation memory space, to which qualitative evaluations of the corrective information stored in the second memory space can be imported, wherein at least one fifth calculating device is provided for the purpose of producing produces collective evaluation information on the basis of the imported qualitative evaluations.

14. One or more servers as claimed in claim 13, characterized in that the fifth calculating device is construed so as to carry out a qualitative evaluation by the inclusion of individually assignable points according to a point scale having a predefined number of points, as made possible for each of the users or participants in the second memory space, wherein the points assigned for each inclusion can be stored in an associated points storage means.

15. One or more servers as claimed in claim 14, characterized in that for the fifth calculating device the point scale is construed so as to make it possible to award points weighted between zero and 100 by each of the users or participants.

16. One or more servers as claimed in claim 15, characterized in that the fifth calculating device forms an average value of the cumulative points imported to the second memory space and assigned in each case by different users or participants and which stores the relevant number in the second memory space, wherein an average point value is calculated by adding together all points weighted between zero and a maximum number of points as have been awarded by users or participants during the course of each evaluation of corrective information, and dividing the result by the number of users or participants that have in each case submitted an evaluation of an item of corrective information.

17. One or more servers as claimed in claim 16, characterized in that a sixth calculating device computes the variance of the cumulative points imported to the second memory space and assigned in each case by different users or participants and which stores the relevant number in the second memory space, the variance being defined as the average deviation of the points from the average point value of the evaluation of a corrective information as ascertained by the fifth calculating device.

18. One or more servers as claimed in claim 17, characterized in that a third copying device successively interprets, on conclusion of predefinable time intervals, the qualitative evaluations of corrective information stored in the second memory space, as being useful or non-useful items of information according to predetermined stipulations relating to averages and variances, in a second decision-making device and which transfers the corrective information, on identifying it as being a useful item of information, to the first memory space while overwriting the relevant previous items of information in the first memory space.

19. One or more servers as claimed in claim 18, characterized in that a timing device is provided, which transmits reset signals to the fifth calculating device and to the sixth calculating device and also to the third copying device at predefinable constant time intervals so as to set the said devices to zero on conclusion of a respective presettable time interval and to effect repetition of the currently assigned function in each subsequent period of time of equal length.

20. One or more servers as claimed in claim 1, characterized in that it is possible for each of the participants to carry out an initial placement of a dual unit having a said first memory space and a said second memory space.

* * * * *